Feb. 17, 1970 R. O. RAGAN 3,496,043
METHOD OF MANUFACTURING AN EMBOSSED LAMINATED FOAM
Filed April 7, 1966

INVENTOR
ROBERT O. RAGAN

BY
ATTORNEY

3,496,043
METHOD OF MANUFACTURING AN EMBOSSED LAMINATED FOAM
Robert O. Ragan, 134 W. 49th St., Minneapolis, Minn. 55409
Filed Apr. 7, 1966, Ser. No. 541,029
Int. Cl. B31f 1/20; B32d 3/12
U.S. Cl. 156—210          1 Claim

ABSTRACT OF THE DISCLOSURE

A method and apparatus is provided for forming a laminated product including a web to which an embossed film of foam plastic is laminated. An endless belt or blanket is formed of plastic air flow foam member capable of taking a permanent impression when pressed against a solid object at a temperature slightly above the softening point of the resin in the air flow foam member. A web of foam plastic film is brought into contact with the impressed surface of the air flow foam member. The foam plastic film is heated and drawn into contact with the impressed surface of the air flow foam member by partial vacuum acting through the air flow foam member. While still supported on this member, the film is laminated to the web.

---

This invention relates to an improvement is embossed, laminated foam and method of manufacture, and deals particularly with a layer of thin embossed plastic foam film adhered to an unembossed substrate.

Thin plastic foam has been found extremely effective as a cushioning foam for packaging a great variety of products such as, for example, cookies and the like. Due to the fact that the plastic foam is a grease-proof material, products containing oil and grease may come in direct contact with it without becoming stained by the penetration of the grease or oil. Embossed foam plastic film has the obvious advantage of increasing the cushioning effect and permitting a thinner film to be used. However, embossed foam plastic films are somewhat difficult to handle as the film is flattened out by the operation of winding the film into rolls. If the size of the core is increased sufficiently to minimize the flattening out of the film during winding, the rolls are difficult to handle.

Attempts have been made to laminate the foam plastic film to an unembossed substrate which holds the embossed areas from flattening out. If the film reaches the laminating roller in undamaged form, the pressure employed to adhere the two films together will flatten out the embossed film. It is a purpose of the present invention to provide an apparatus for attaching an embossed thin plastic foam web to a web of unembossed material without destroying the form of the embossed film.

An object of the present invention resides in the provision of a drum or a belt having upon its surface an air-permeable layer of material having on its outer exposed surface a pattern similar to that on the embossed film. A web of thin foam plastic film is applied over the patterned surface of the drum or belt and is held in contact therewith by air drawn through the air-permeable surface. Heat is applied to the film which softens the film sufficiently so that it may be drawn against the pattern surface by partial vacuum.

While the thin foam film is still supported by the patterned surface of the drum or belt, adhesive is applied to the outer surface of the film, and the film is brought in contact with the unembossed substrate web. The necessary sealing pressure is applied to adhere the web and film together. As this pressure is applied while the film is supported by the patterned surface, the pressure does not collapse the embossed areas. The laminated webs may then be rolled or cut into sheets, the embossed areas being held in form by the adherence of the surface of the embossed film to the substrate.

A feature of the present invention resides in the use of an air flow foam for the pattern-forming material. One type of foam which has been successfully employed is Nalcon encapsulated unembossed foam film. This cellulose sheet material is made by National Lead Company of fibres which have been encapsulated with polyethylene to the extent of 50% polyethylene, and 50% cellulose. The sheet employed is approximately 85 mils thick. This material takes a permanent impression if pressed against a solid object at a temperature slightly above the softening point of the polyethylene resin which in this case is about 250° F.

In general, the method includes the steps of applying the thin film of plastic foam to the surface of a patterned air-permeable belt or blanket, applying heat to the film, drawing the film into the design formed in the belt or blanket by vacuum acting through the belt or blanket, applying adhesive to the surface of the film, and laminating the embossed film to a web of paper or the like which is preferably unembossed while the film is still against the patterned belt or blanket. Obviously, the adhesive could be applied to the substrate if preferred.

A feature of the present invention lies in the fact that the partial vacuum used for forming the film to the contour of the air-permeable belt or blanket may be more intense than the vacuum which is subsequently used to hold the embossed film against the patterned blanket during the application of adhesive to the surface thereof. Once the film has been embossed, little air pressure is required to hold the film in place against the blanket.

These and other objects and novel features of the present invention will be more clearly and fully set forth in the following specification and claim.

In the drawings forming a part of the specification,

Figure 1:
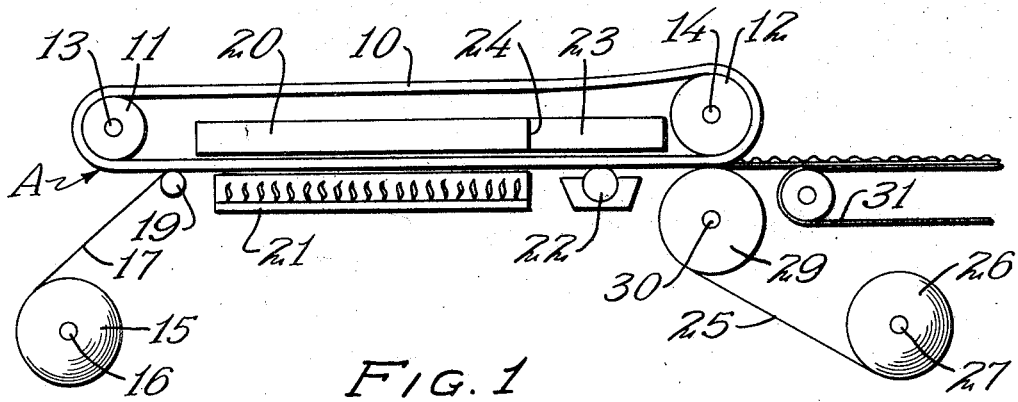
FIGURE 1 is a digrammatic view showing a belt-type apparatus for embossing the film and for holding the film during the lamination process.
Figure 2:
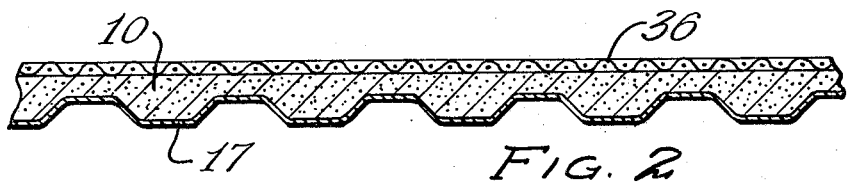
FIGURE 2 is an enlarged sectional view through a portion of the air-permeable belt and the embossed film.

One form of apparatus which may be used to accomplish the method is indicated in FIGURE 1 of the drawings. As indicated, an air-pervious belt 10 is supported between a pair of rollers 11 and 12 mounted on shafts 13 and 14, respectively, one of which is driven by drive means not illustrated in the drawings. The belt 10 of the apparatus A is indicated in FIGURE 2 of the drawings. The belt 10 comprises an endless web of air-pervious material such as air flow foam. One type of foam which has been successfully used is a product known as Nalcon made by the National Lead Company. This material is cellulose sheet material formed of fibres which have been encapsulated with polyethylene to the extent of 50% polyethylene, and 50% cellulose. In the particular arrangement illustrated, the sheet is approximately 0.085" in thickness. This material takes a permanent impression if pressed against a solid object at a temperature slightly above the softening point of the polyethylene resin. In this case the temperature is about 250° F.

Figure 4:
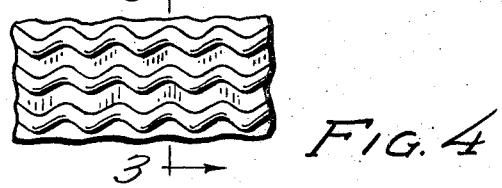
FIGURE 4 is a plan view of a small portion of the embossed film.

Other air-pervious material can be used such as open cell vinyl foam having the design melted into its outer surface. The pattern can be impressed into the foam by various means, such as by a plate similar to a printing plate. A commercial stereo mat has also been used to impress a design in the foam. Thus the embossed design may be in the form of a series of ridges as is indicated in FIGURE 4 of the drawings, or the embossed design may be a printed area. As an example, a trademark or a similar design may be impressed in a continuous pattern throughout the surface of the belt to provide a design which also serves as an advertisement or reminder of the name of the product being packaged.

A thin web of plastic foam, which might comprise a polystyrene web or the like, is provided in a roll 15 mounted upon a shaft 16 beneath one end of the belt 10. The film 17 from the roll 15 is guided by a suitable guide roller 19 into surface contact with the lower reach of the belt 10. A vacuum chamber 20 is provided above the lower reach of the belt 10 designed to draw air through the belt. Thus the film 17 is held against the under surface of the belt 15 by air pressure caused by drawing air through the belt. Beneath the vacuum chamber 20 is provided a heating chamber 21 designed to heat the film to a softening temperature. The heating chamber may be heated by gas flames, electric heating elements, radiant heating units or any other suitable means. As the lower reach of the belt 10 moves to the right as indicated in FIGURE 1, the film 17 is drawn into the pattern of the under or outer surface of the belt 10 by vacuum.

After passing over the heating chamber 21, the film passes over a glue roller 22 which applies a suitable adhesive to the under surface of the film. During this operation, the film is held in the pattern of the belt by vacuum. If preferred, one end 23 of the vacuum chamber 20 may be separated from the remainder thereof by a partition 24, and the vacuum in the chamber portion 23 may be reduced in value, it being only necessary to hold the film in contact with the belt.

A web of substrate material 25 is drawn from a roll 26 mounted upon a shaft 27, the substrate web being guided over a laminating roller 29 positioned beneath the roller 12 which forms the cooperable laminating roller. The roller 29 is mounted upon a shaft 30 and brings the web 25 into face contact with the under surface of the embossed film 17. The combined web thus formed may be conveyed from the apparatus by a conveyor 31 which extends to a sheeter or winder, not illustrated in the drawings.

Figure 3:
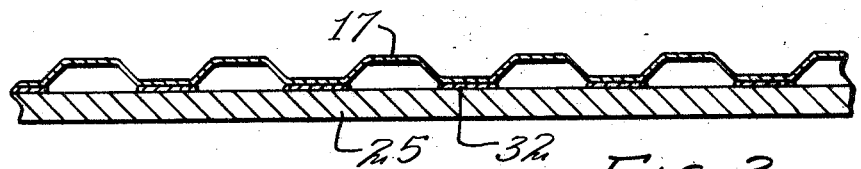
FIGURE 3 is an enlarged sectional view through a portion of the embossed film and its unembossed substrate.

FIGURE 3 is an enlarged sectional view which shows the substrate web 25, the foam plastic film 17, and adhesive 32 securing a surface of the embossed film to the substrate web 25. When laminated in this manner, the embossed areas of the film are much more resistant to collapse by pressure than unlaminated embossed film even in rolled form because of the fact that the flat surface of the substrate engages against the crests of the embossed areas, and also because of the fact that the laminated areas are held from collapse by being anchored to the substrate. With normal care in handling, much of the original form of the embossed film is maintained in the finished product.

Figure 5:
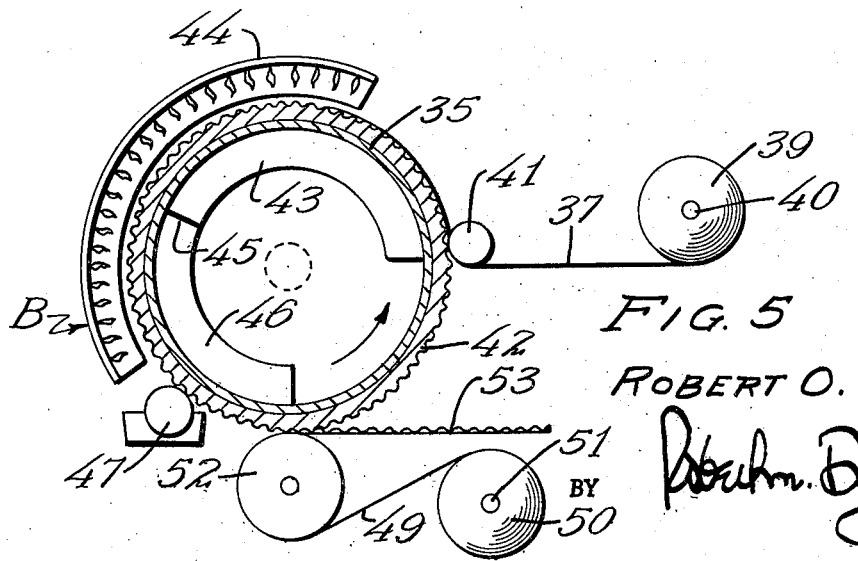
FIGURE 5 is a diagrammatic view similar to FIGURE 1 but showing a drum type-device for accomplishing the method.

FIGURE 5 of the drawings shows a modified form of apparatus which may be used to carry out the process. The apparatus B illustrated in FIGURE 5 includes a drum 35, the surface of which is air-pervious. The drum 35 may be perforated, or may have a screen surface. FIGURE 2 shows the belt 10 as having a screen surface 36, and the drum 35 may be similarly formed. The drum 35 is encircled with an air-pervious blanket 42 having a patterned outer surface similar to that of the belt 10.

The foam plastic film 37 is fed from a roll 39 mounted upon a shaft 40 arranged on an axis parallel the axis of the drum 35. This film 37 is guided by a roller 41 about the surface of the air-pervious blanket 42 encircling the drum 35. A vacuum chamber 43 is provided within the drum 35, the vacuum drawing the film 37 against the outer embossed surface of the blanket 42. A heating chamber 44 encircles a portion of the drum 35 and acts to heat the film to the extent necessary to permit the film to be embossed in the embossed surface of the air-pervious blanket 42 encircling the drum 35. The vacuum chamber 43 may be divided by a partition 45, and the portion 46 of the vacuum chamber inwardly of the completely embossed portion of the film may be subjected to lesser vacuum.

An adhesive applicator 47 is provided to apply adhesive to the surface of the embossed film. A substrate web 49 is fed from a roll 50 supported on a shaft 51 parallel to the axis of the drum 35. The sheet 49 may be guided around a laminating roller 52 and applied to the adhesive-coated surface of the film 37. The combined web 53 may be carried away from the apparatus by a suitable conveyor, not illustrated in the drawings.

In either of the structures described, the film is embossed while supported in the outer embossed surface of the belt or blanket, preferably by the action of vacuum drawing air through the pores of the belt or blanket. The embossed web is supported by the belt or blanket while adhesive is applied to the surface thereof, and the embossed web is still supported by the belt or blanket during its passage between the laminating rollers which, in the apparatus B, comprise the drum 35 and the roller 52. Thus the surface of the embossed film is held from collapse until the laminating operation is complete.

The laminated material may be used for a wide variety of purposes. The surface is not only grease-proof, but it also forms a cushioning film for fragile articles. The embossed foam surface is very attractive, and is capable of forming a display carton or tray of striking appearance.

For the purpose of the claim, the endless belt 10 and the porous blanket 42 may both be described as an endless plastic air flow foam member.

In accordance with the patent statutes, I have described the principles of construction and operation of my improvement in embossed, laminated foam and method of manufacture; while I have endeavored to set forth the best embodiment thereof, I desire to have it understood that obvious changes may be made within the scope of the following claim without departing from the spirit of my invention.

I claim:
1. A method of producing a laminated structure with the use of an air-pervious endless plastic foam member having an embossed outer surface including the steps of:
   bringing a thin foam plastic film into contact with the outer surface of the air pervious foam member,
   heating the film and drawing the film into the embossed surface, embossing the film,
   applying a web of unembossed material into contact with the film while supported by said air pervious foam member, and
   applying adhesive between said film and said web before bringing the film and web into contact.

(References on following page)

References Cited

UNITED STATES PATENTS

| | | | |
|---|---|---|---|
| 2,660,757 | 12/1953 | Smith et al. | 264—92 |
| 3,026,231 | 3/1962 | Chavannes | 156—205 |
| 3,180,782 | 4/1965 | Coates et al. | 161—73 |
| 3,241,182 | 3/1966 | Kessler | 18—12 |
| 3,305,419 | 2/1967 | Voelker | 156—209 |
| 3,346,438 | 10/1967 | Chavannes | 156—292 XR |
| 2,776,451 | 1/1957 | Chavannes | 264—92 |
| 3,235,433 | 2/1966 | Cvacho et al. | 156—229 |

JOHN T. GOOLKASIAN, Primary Examiner

HENRY F. EPSTEIN, Assistant Examiner

U.S. Cl. X.R.

156—292; 161—68, 116, 122, 127, 133